United States Patent [19]

Christensen et al.

[11] 4,074,072

[45] Feb. 14, 1978

[54] MULTIPROCESSOR CONTROL OF A PARTITIONED SWITCHING NETWORK BY CONTROL COMMUNICATION THROUGH THE NETWORK

[75] Inventors: Carl Christensen, Berkeley Heights; Arthur Dickson Hause, Watchung; Henry Stanton McDonald, Summit, all of N.J.

[73] Assignee: Bell Telephone Laboratories, Incorporated, Murray Hill, N.J.

[21] Appl. No.: 689,510

[22] Filed: May 24, 1976

[51] Int. Cl.² ............................................. H04Q 11/04
[52] U.S. Cl. ............................ 179/15 AQ; 179/18 ES
[58] Field of Search ........ 179/15 AT, 15 AQ, 18 ES, 179/18 EA, 18 G

[56] References Cited

U.S. PATENT DOCUMENTS

| | | | |
|---|---|---|---|
| Re. 27,703 | 7/1973 | Stafford et al. | 340/172.5 |
| 3,623,014 | 11/1971 | Doelz et al. | 340/172.5 |
| 3,882,455 | 5/1975 | Heck et al. | 340/146.1 BE |
| 3,925,620 | 12/1975 | Edstrom et al. | 179/15 AT |
| 3,927,267 | 12/1975 | Voyer et al. | 179/15 AT |
| 3,937,936 | 2/1976 | Saporito et al. | 235/153 AE |
| 3,959,596 | 5/1976 | Bojanek et al. | 179/15 AT |
| 3,963,872 | 6/1976 | Hagstrom et al. | 179/18 GF |
| 3,969,701 | 7/1976 | Hemdal | 179/18 ES X |
| 3,974,340 | 8/1976 | Ghisler | 179/15 AT |
| 3,974,343 | 8/1976 | Cheney et al. | 179/18 ES |

OTHER PUBLICATIONS

"An Experimental Digital Local System", by H. S. McDonald, Proc. of the International Switching Symposium of 1974, pp. 212/1–2.2/5.

"Common Control–Electromechanical", Chap. 6, Switching Systems, 1961, pp. 71–88, A.T. & T. Co.

*Primary Examiner*—Thomas W. Brown
*Attorney, Agent, or Firm*—Charles Scott Phelan

[57] ABSTRACT

A centrally located stage of a time division multiplex switching network is partitioned into blocks and a separate processor is provided to control each such block. The partition is extended to the edge of the network by having each partition processor control through the network both the network equipment in adjacent stages directly coupled to the controlled block, and a preassigned portion of the remainder of the network out to the edge thereof which can be reached either through such controlled equipment or through similar equipment of other partitions. In addition, translating, scanning, and service functions are advantageously separated out of the partitioned processors and performed by separate processors that communicate through the call switching network with the partition processors and/or the network-edge ports.

23 Claims, 8 Drawing Figures

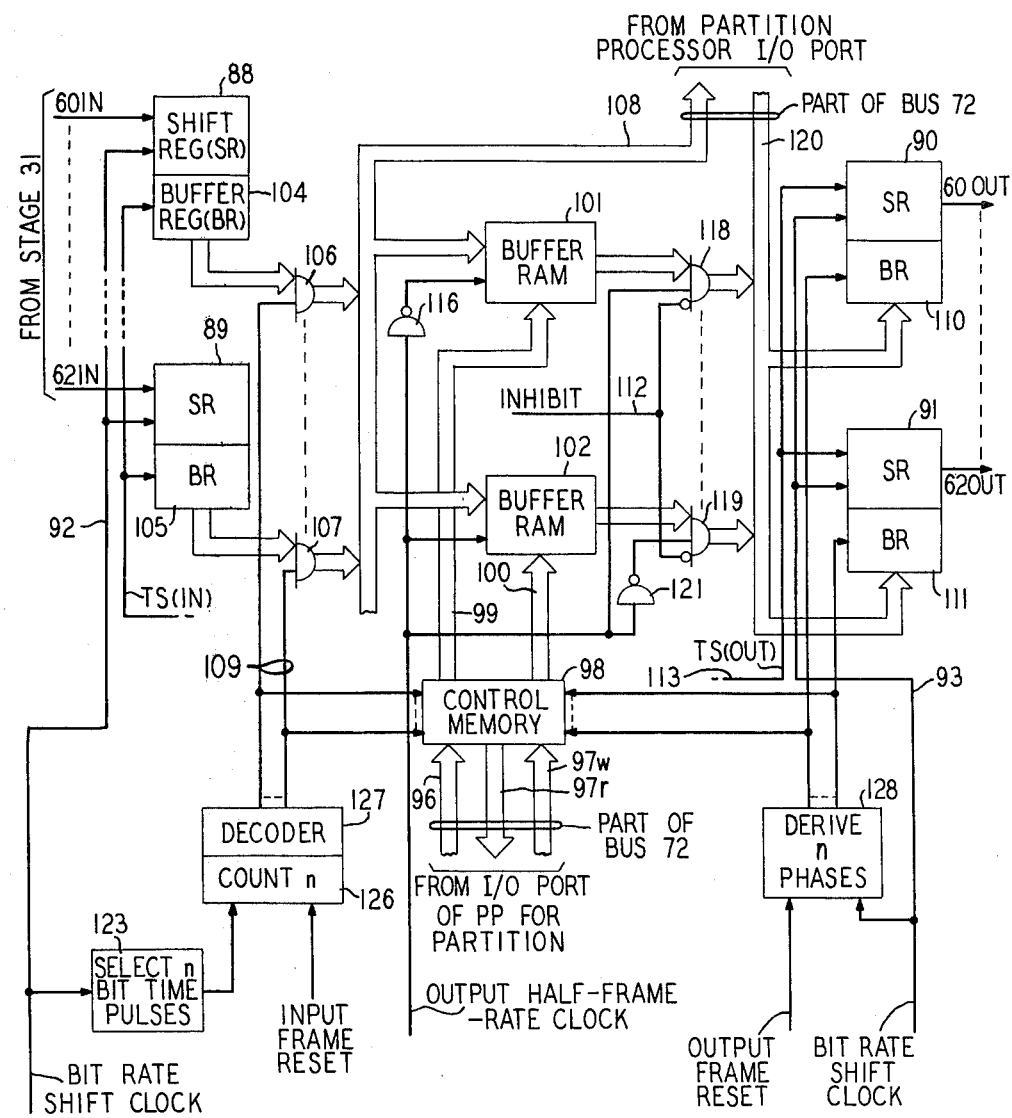

MULTIPROCESSOR CONTROL OF A PARTITIONED SWITCHING NETWORK BY CONTROL COMMUNICATION THROUGH THE NETWORK

BACKGROUND OF THE INVENTION

1. Field of the Invention

This invention relates to electronic switching system networks and, in particular, it relates to switching systems that employ time division multiplex switching networks.

2. Description of the Prior Art

Communication switching networks typically have a single call processor facility for controlling the entire network. That facility may include working and standby processors and it may also include multiple processors cooperating to perform different parts or phases of a call processing function. A processor failure can cause extensive call disturbance in the network in the small but finite time required to detect the failure and to transfer to a standby machine. The larger the network the longer will be the recovery time and the more extensive will be the call disturbance.

In addition, switching system designers usually try to predict the growth range for the system and provide, for a given office, the type of processor which it is anticipated will be required when the office reaches its maximum size. Such a design practice necessarily incurs a high initial cost for a small office with significant growth potential.

SUMMARY OF THE INVENTION

The foregoing problems are alleviated, in accordance with the present invention, by dividing a switching network into plural edge-to-edge partitions, each controlled by a separate processor coupled to a discrete block of a stage of the network. The processors communicate with one another through the network for controlling interpartition calls.

In one embodiment, the processor-coupled stage is an intermediate one of plural, signal path, switching stages.

It is one feature of the invention that at least one additional such partition block and an associated processor are set aside as spare equipment so that, in the event of a fault, e.g., in a working partition processor, the spare equipment can be readily instructed to replace the faulted equipment with respect to at least the network-edge ports of the partition served by the faulty processor.

It is another feature that in one embodiment translating, scanning, and service functions that can conveniently be separately performed are separated out of the partition processor and performed by separate processors that communicate through the call switching network with the partition processors and with circuits coupled to the network-edge ports.

BRIEF DESCRIPTION OF THE DRAWING

A more complete understanding of the invention and its various features, objects, and advantages may be obtained from a consideration of the following detailed description in conjunction with the appended claims and the attached drawing in which:

FIG. 4 is a diagram of a time slot interchanging switch stage which is useful in the network of FIGS. 1 and 2;

DETAILED DESCRIPTION

Figure 1:
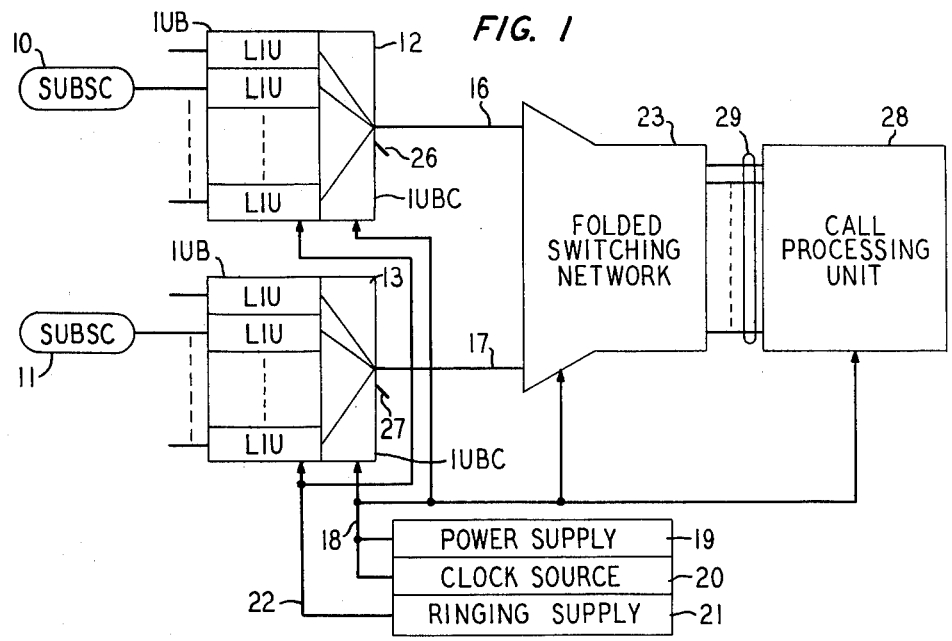
FIG. 1 is a simplified block and line diagram of a time division multiplex, local, switching system in accordance with the present invention.

In FIG. 1, outlying subscriber station sets are connected to line interface units (LIU) in a central office. Only two such station sets 10 and 11 are shown in the drawing. The interface units are grouped into respective interface unit blocks (IUB), each of which is operated by an interface unit block control (IUBC) schematically represented as a rectangle at the right-hand end of each IUB. For convenience of illustration, only two interface unit blocks 12 and 13 are shown in FIG. 1. One form of line interface unit with associated grouping into blocks, each controlled by an IUBC, is shown in the copending application of H. S. McDonald, Ser. No. 592,514, filed July 2, 1975, Now U.S. Pat. No. 4,007,334, entitled "Time Division Digital Local Telephone Office with Telemetering Line Unit," and assigned to the same assignee as the present application. Similar information regarding the LIUs and their use in a time division switching system is also contained in an article by H. S. McDonald published in the *Proceedings of the International Switching Symposium of* 1974, entitled "An Experimental Digital Local System," pages 212/1–212/5.

In brief, with respect to the IUB, each LIU advantageously cooperates with an analog subscriber station set and loop circuit connecting such station set to the LIU in the central office. Each LIU includes an analog/digital codec as well as gates operated by the IUBC for multiplexing the outputs of the various LIUs in the IUB onto a time division multiplex highway, such as the highways 16 and 17 in FIG. 1. The output of each LIU that is so multiplexed includes at different times digital representations of voice signals and low frequency supervisory signals, as well as digital information relating to the states of the telephone line and other circuit points in the LIU. Similarly, control signals are receivable in the LIU for controlling different circuit points in the LIU. Each IUBC also receives, from office energy supplies, operating power and clock signals; and a ringing signal supply provides ringing signal to respective line interface units. These energy supplies will subsequently be further described.

The IUBC functions as a control memory for its LIUs to couple them to the time division highway at correct time slots for voice and control communications, and it maintains corresponding control signals for such purposes. The term "control memory" as herein used with reference to circuitry for time sequentially controlling a set of other circuits, and the term includes both memory per se and logic circuits for cooperating with that memory to effect the sequential control. To this end, the IUBC receives the necessary control information by way of a control signal channel, which will be subsequently described in connection with FIG. 6A and which is also described in the aforementioned McDonald application. Thus, the IUBC operates its LIUs in part as a multiplexer/demultiplexer (muxdem) for time slot assignment. They are also operated in part as a concentration/expansion stage because there are typically fewer time slots available on the time division highway than there are LIUs in the IUB.

A folded switching network 23 is shown as a block which is partly in a rectangular configuration and partly in a tapered configuration at the left-hand end of the schematic representation. This representation symbolizes an intermediate, or center, network stage and at least one additional stage that advantageously performs further concentration/expansion functions. Although separately shown in FIG. 1, the IUBs with their codec and time switching muxdem functions also comprise a further, or network-edge, stage of the network with an LIU at each network-edge duplex port. This overall arrangement is a so-called folded network with all network edge connections along the left side at the LIUs as illustrated in FIG. 1. A path from the edge to the center is automatically matched by a return path from center to edge. This folding effect is incorporated in the switch design in that a single memory controls the paths through an incoming switch and its outgoing mate. A path between two networkedge ports, i.e. two LIUs, begins at one port, passes through the network to a center-stage switch, and passes through the network again to the other port. Thus, the folded network representation in FIG. 1, as so far described, corresponds to a 5-stage unfolded network. Those five stages include a left-hand edge stage, a left-hand additional concentration stage, the intermediate stage, a right-hand expansion stage, and a right-hand edge stage. The name "intermediate stage" is used herein even though in the folded format of FIG. 1 that stage is at the right-hand side of the folded network as illustrated. The network has been limited to the indicated stages for purposes of description of the present invention. However, it is to be understood that additional stages can be provided to enlarge the number of lines that can be served by the described switching system in accordance with known network design techniques.

Although the IUBs 12 and 13 are shown as coupled to the remainder of the illustrated switching network by way of single bidirectional time division multiplex highways 16 and 17, respectively, there are advantageously two such highways available at the LIUs as schematically indicated by the short diagonal lines 26 and 27, respectively. The two highways for each IUB are sometimes called A and B highways. These additional time division highways are available to respective LIUs in the alternative, as specified by a common control processor, to be described, when providing necessary information for a connection of an LIU to the network. The alternate highways allow the traffic of each LIU to be directed to one or the other of two duplicate folded switching networks, sometimes called A and B networks. The A network 23 is the only one specifically illustrated in FIG. 1.

The aforementioned intermediate stage of the network 23 is advantageously located at the "crease" in the folded network and provides one avenue of access for a call processing unit 28. That unit works through the network to control operation of the network. Multiple circuit connections 29 between the network 23 and the call processing unit 28 schematically represent individual buses from plural processors of the unit 28 extending to respective blocks of the intermediate stage of the network 23, as will be further shown and described in connection with FIG. 2.

Office energy supplies include a power supply 19, a clock source 20, and a ringing signal supply 21. Outputs from the power supply 19 and the clock source 20 are provided by separate distribution circuits, schematically represented by the single circuit 18, to the various IUBCs, the folded switching network 23, and the various parts of the call processing unit 28. Clock 20 provides various periodic signals at different rates and for use in different parts of the system, many of which signals will be hereinafter mentioned. Techniques for developing and distributing such clock signals are well known in the art and so are not here shown in detail. Similarly, the output of the ringing supply 21 is extended by a distribution circuit 22 to individual line interface units through which the ringing signal application to individual subscriber lines is controlled at each such LIU by signals initiated from the call processing unit 28 and coupled through the network in accordance with a control plan subsequently hereinafter outlined. Duplicate office energy supplies, not shown, are provided for the duplicate, or B, switching network which is also not shown. The duplicate clock source is synchronized with the illustrated source 20, and the duplicate power supply is advantageously operated on a standby basis with respect to the call processing unit 28.

Figure 2:
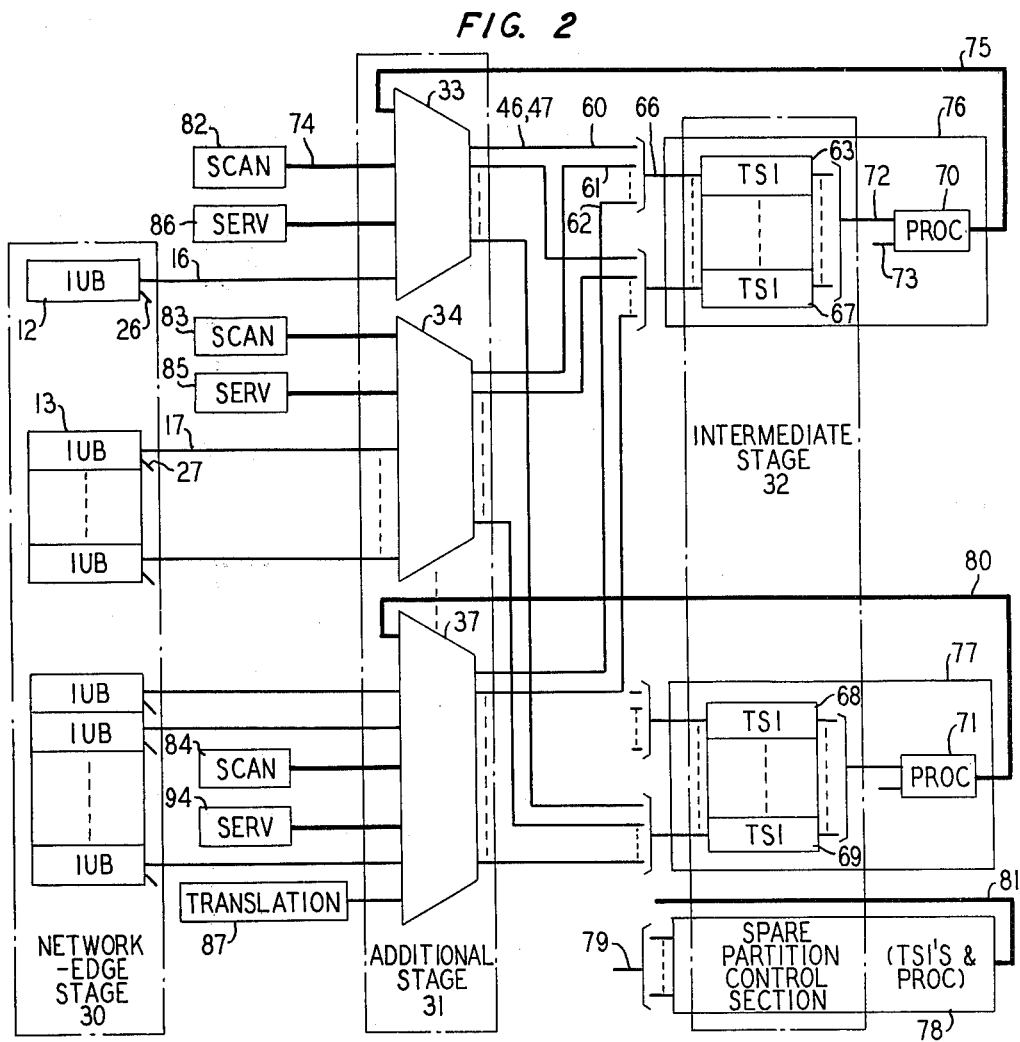
FIG. 2 is a more detailed block and line diagram of an embodiment of the switching network for the system in FIG. 1.

In FIG. 2 the switching network and the call processing unit are illustrated in somewhat greater detail. In particular, the network-edge stage 30, the additional stage 31, and the intermediate stage 32 of the overall folded time division switching network are specifically indicated. The interface unit blocks with their respective IUBCs comprise the network edge stage 30. Such IUBs are grouped together, and each group has its digital ports connected by time division highways, or links, to networkedge-side ports of a different block of the additional stage 31 of the overall network. The full network-edge-side capacity of an additional stage block need not be taken up by IUBs and can be employed for trunk interface units, not shown, for the office or for other communication switching functions as will be hereinafter described.

The additional stage 31 is advantageously a time multiplexed switch and includes a plurality of call path switching blocks. Three such blocks 33, 34, and 37 are specifically indicated in FIG. 2. Each such block comprises a plurality of switches for interconnecting any duplex network-edge-side port thereof to any duplex intermediate-stage-side ports thereof, which are in turn linked to the intermediate stage 32. Each such switch in a block of the additional stage 31 comprises a multiplexer, a demultiplexer, and a control memory for controlling both of them, all as illustrated in greater detail in FIG. 3.

Figure 3:
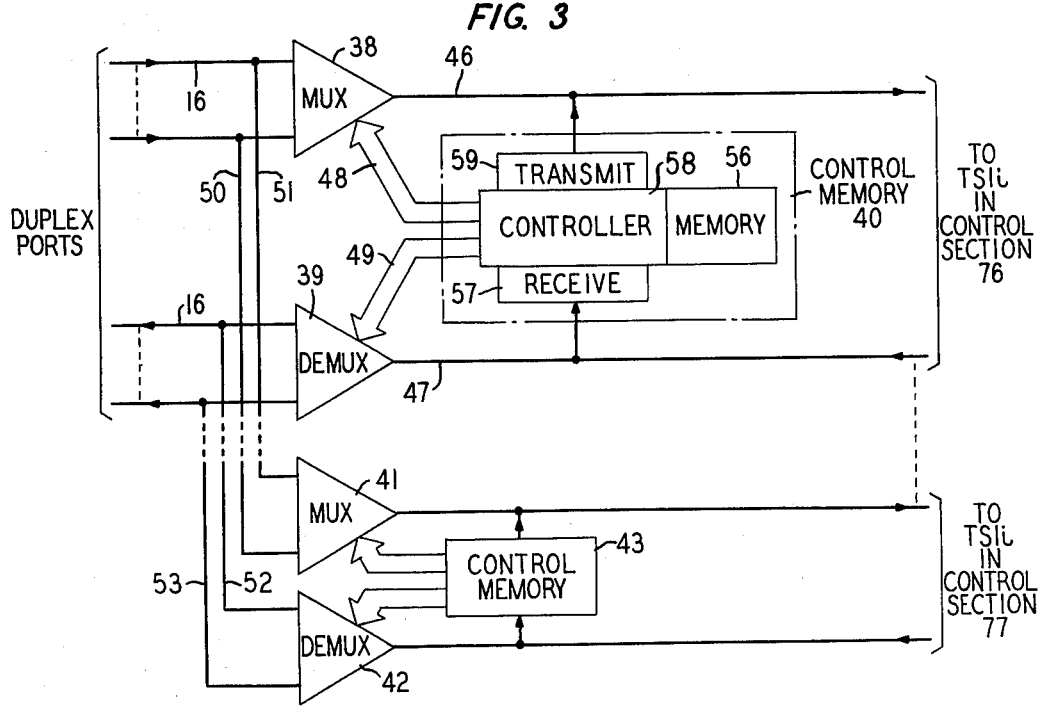
FIG. 3 is a diagram of a space division switching stage which is useful in the network of FIGS. 1 and 2.

Referring to FIG. 3, two of the aforementioned switches of an additional stage block, e.g. 33, are specifically illustrated. One such switch includes a multiplexer 38, a demultiplexer 39, and a control memory 40. The other switch similarly includes a multiplexer 41, a demultiplexer 42, and a control memory 43. The multiplexers and demultiplexers are electronically timegated, selectorswitch arrangements of a type now well known in the art. For example, the multiplexer 38 combines signals from plural input circuits onto a single, unidirectional, 2-wire output circuit, schematically represented by the circuit 46, in a time sequence as determined by the control memory 40. The demultiplexer 39 similarly performs a reverse function by distributing time sequential signals from a single, unidirectional, 2-wire input circuit 47 to respective ones of its plural, unidirectional, 2-wire output circuits. An output from control memory 40, in the same form in each time slot on a conductor of each of two multiconductor buses 48 and 49 to the multiplexer 38 and demultiplexer 39, operates corresponding gates in the multiplexer and demultiplexer so that a selectable duplex communication path is established in any such time slot between the 4-wire link represented by circuits 46 and 47 and any network-edge-side port of the multiplexer-demultiplexer combination. Separate buses 48 and 49 are employed since at stage 31 the actual switch operations in a multiplexer 38 and demultiplexer 39 are slightly offset by delay circuits (not shown) to match corresponding time slot signal delays through the network. Each corresponding pair of an input circuit to multiplexer 38 and an output circuit from demultiplexer 39 comprises a 4-wire time division multiplex highway, e.g., 16, extending either to one of the IUBs in the network-edge stage 30 or to other appropriate equipment. Furthermore, corresponding circuits of each such highway on each switch are strapped together so that the 4-wire link on the intermediate-stage side of the switch has access through its switch to any network-edge-side port of the block containing the switch. To this end the 2-wire straps, such as 50 and 51, interconnect corresponding inputs of multiplexers 38 and 41. In like fashion, the 2-wire straps 52 and 53 interconnect corresponding outputs of demultiplexers 39 and 42.

In each of the control memories, such as the memories 40 and 43, there is provided a random access memory 56 that has one word location for each time slot of a sample frame. Each such location stores the name of the pair of muxdem gates which are to be operated in the corresponding time slot at synchronized by clock signals from the clock source 20 in FIG. 1. Each control memory also includes a receive circuit 57 which receives signals from the 2-wire circuit 47 and includes logic for recognizing the name, i.e., a digital designation, of the control memory 40 appearing in control channel time slots, which will be described. The circuit 57 also advantageously converts the received bit-serial signals to bit-parallel format and couples those associated with the recognized memory name to a controller 58.

Those received signals identify the time slot word location of the memory 56 and include an operation code which directs the controller 58 either to read or to write that location. In addition the received signals include, in the case of a writing operation, the name of the muxdem gate pair to be activated in that time slot.

Controller 58 coordinates the writing and reading of memory 56 in response to information applied from the receive circuit 57. In addition, controller 58 decodes readout signals from memory 56 in order to apply an appropriate control signal on the correct lead in each of the buses 48 and 49 to operate the muxdem circuits. In addition, controller 58 causes a requested readout of the memory to be sent to an appropriate part of the call processing unit 28 by way of a transmit circuit 59. Such a readout may be requested, for example, in accordance with a maintenance audit procedure of the processing unit in order to verify the content of a particular location in memory 56.

Transmit circuit 59 assembles information received from controller 58 for transmission to the circuit 46. A parallel-to-serial format translation is performed when the transmit circuit 59 outputs the information signals in the correct control time slots under the control of the clocked operation of the controller 58.

Returning to FIG. 2, the intermediate stage 32 of the network includes a plurality of blocks of time slot interchangers. Details of one such interchanger will be shown and described in connection with FIG. 4. Each time slot interchanger (TSI) is advantageously arranged with multiple inputs from plural links extending from the additional stage 31. One such link is provided from a corresponding switch of each of the switch blocks of the stage 31. Only a few such links are actually shown in order to avoid unduly complicating the drawing. For example, three such links 60, 61, and 62 are shown extending from switch blocks 33, 34, and 37, respectively, to a single time slot interchanger 63 in the intermediate stage 32. The link 60 is also shown, by use of dual reference characters, as corresponding to circuit pair 46, 47 previously discussed in connection with one switch in FIG. 3.

For convenience of illustration, the three links 60, 61, and 62 are shown in the drawing as merged into a bus 66. Similar link representations are provided for an additional time slot interchanger 67 in the same block of stage 32 with the interchanger 63 and for two time slot interchangers 68 and 69 for another block of the stage 32. It is thus apparent that each time slot interchanger block includes a plurality of time slot interchangers. Factors such as the number of interchangers per block of stage 32, the number of links accommodated per interchanger, the number of blocks in stage 31, and the number of stages in the overall network are determined by such things as the number of lines to be served, the desired blocking probability, and the technology used to implement the various circuits. These are network considerations known in the art and not necessary to an understanding of the invention. It is also possible for a network block of stage 32 to include a set of switches rather than TSIs, or even that such a block could contain a multistage network of switches. The choice between TSIs and switches for a particular application depends upon such factors as partition size, network size, switch size, and network blocking performance.

Each time slot interchanger also has an information signal connection through an input/output (I/O) port of its associated processor. Two such processors 70 and 71 are specifically shown in the drawing and are two of the processors which make up the call processing unit 28 of FIG. 1. A bus 72 includes a set of circuits extending from one I/O port of the processor 70 to all of the time slot interchangers of the block including interchangers 63 and 67. A short line 73 connected to the processor 70 schematically represents a similar bus extending from the processor 70 to a corresponding block of time slot interchangers in the duplicate B network previously mentioned in connection with FIG. 1.

Each combination of time slot interchanger block in the intermediate stage 32 and its associated partition processor is here designated a "partition control section." Thus, the processor 70 and the interchanger block 63, 67 comprise the partition control section 76. Similarly, the processor 71 and the interchanger block 68, 69 comprise the partition control section 77. The processor of a partition control section controls the operation of the interchanger block in the same section, and it also controls the remainder of a partition of the rest of the network extending to the edge of the network in a manner which will be subsequently described.

Control is exercised with respect to the interchanger block by way of direct connections to control memories of the respective interchangers as will be shown in FIG. 4. The control is exercised over the switches of the additional stage 31 which are directly connected by links to interchangers of the block, e.g., 63, 67, by communicating with the respective control memories, also directly connected, of those switches in the aforementioned control channel comprising two time slots per sample frame. Those control channel time slots are accessed for section 76, by the processor 70 through the bus 72 and a corresponding one of the interchangers 63, 67. In that channel the control path extends along a corresponding one of the links, such as 46, 47, in a link bus, such as the bus 66, to the control memory of the controlled switch. Since network circuits beyond edge-side, or outer, ports of the additional stage 31 can be accessed from different partitions, as should be evident from the foregoing description of FIGS. 2 and 3, the control of network circuits, only IUBCs in the illustrative embodiment, beyond those ports toward the edge of the network is assigned to particular partition processors. Such assignment is effected by, for example, appropriate software number translation arrangements involving a binary coded name associated with network equipment numbers provided to partition processors in the course of call processing and identifying the partition in which the numbered equipment is located.

Each partition processor functions as a call processing unit for its partition in a fashion similar to that followed by such processing units in known communication switching networks. For that purpose the processor memory (not separately shown in FIG. 2) includes certain tables of known types that are useful in describing the present invention. One such table is a network partition description naming controlling network-edge-side ports in stage 31, controlled muxdem switches in stage 31, and controlled TSIs in stage 32. Such a list is useful for cross checking the accuracy of other lists and tables in the processor memory.

Another table contains a link map naming the links belonging to this partition and that join stages 31 and 32, and other links that are attached to network-edge-side ports belonging to this partition. For each such link, there are 64 subentries, one for each time slot, in an illustrative 64-time-slots per frame system. Each of those entries shows the status (busy or idle) in that time slot. The last two time slot entries for each link are permanently busied because dedicated for control channels usage. Another list is accessed by names of IUBs assigned to this partition and names the network-edge-side ports of stage 31 to which such IUBs are attached. There is also a list of control channel paths that shows network connections for those paths between controlled TSIs in stage 32 and controlled IUBs in stage 30. Another list is accessed by names of SCAN processors assigned to this partition and gives as a major entry the network-edge-side ports to which such SCAN processors are attached, and a subentry for each SCAN processor contains a table of correspondence between SCAN processor time slots and connected IUBs (listed by port names). Also, for each SCAN processor there is an entry that lists the time slot on which the partition processor can communicate with that SCAN processor through its interprocessor communication channel. Another list accessed by names of SERV processors provides their stage number and network-edge-side port connections therein and provides the time slots to be used on the interprocessor communication channel. Each SERV processor entry on the latter list also has an allocation table that provides such information as the assignment of internal SERV processor resources (processes) to SERV processor port time slots. A further list accessed by names of other partitions yields the corresponding time slots for communication with the partition processor of each such partition via the interprocessor communication channel. A similar entry provides the interprocessor time slot for communication with translation processor 87, and likewise there are entries for any other processor with which this partition must communicate.

In addition to the preceding lists of resources belonging to each partition, each partition process has memory set aside for call records, i.e., records of calls in the process of being set up or taken down, similar to those described, e.g., for No. 1 ESS by D. H. Carbaugh, G. G. Drew, H. Ghiron, and Mrs. E.S. Hoover in "No. 1 ESS Call Processing," B.S.T.J., Vol. XLIII, No. 5, Part 2, September 1964, pp. 2483-2531.

The resource list for partition processor 70 illustratively includes TSIs 63, 67; the switches directly connected (by links between stages 31 and 32) to those TSIs in blocks 33, 34, and 37; part of the IUBs, e.g., 12 and 13 connected to each of those blocks; SCAN processor 82; and SERV processor 86. The similar list for partition processor 71 illustratively include TSIs 68, 69; the switches directly connected (by links between stages 31 and 32) to those TSIs in blocks 33, 34, and 37; another part of the IUBs connected to each of those blocks; SCAN processor 83; and SERV processor 85. In each resource list, the names of IUBs and switches advantageously include identification of the phase within a control channel time slot during which the control channel for those named elements should be accessed at the appropriate TSI of stage 32 as will be subsequently further discussed. Such names also indicate the TSI number to be used and whether the A or the B network is involved.

At least one spare partition control section 78 is provided in the network, and it includes the same elements as the other partition control sections such as the sections 76 and 77. The spare section 78 is also connected in the same manner as the other sections to its own set of switches in the various blocks of the additional stage 31 as schematically represented by the partial bus 79 extending from ports of the spare section 78 toward the additional stage 31. The spare section 78 differs from other partition control sections of the network in that the spare section processor memory area used for the part of the equipment resource list dedicated to equipment assigned by software translations is vacant pending assumption by the spare section of a working status. That memory area includes only names of directly connected equipment, e.g., TSIs and stage 31 muxdems. In other words, when a spare section is directed to assume control of a network partition from a working section which had theretofore controlled that section, the partition-defining information of the previously controlling partition control section must be transferred to the spare partition control section.

The transfer of partition-defining information and the interprocessor communication leading up to it are effected by way of a communication channel which is available to the various partition processors in a manner which will be subsequently described. However, it is presently indicated that such communication channel is advantageously effected by way of a duplex I/O port of each processor and a circuit extending from that port to an edge-side port of some stage of the switching network. In the illustrative embodiment, circuits 75, 80, and 81, indicated by broader than normal lines, provide connection from the respective processors of the partition control sections 76–78 to edge-side duplex ports of blocks in stage 31. Circuit 81 for spare section 78 is assumed in the illustrative embodiment to be similarly connected to one of the blocks which is not specifically shown in the additional stage 31.

Figure 5:
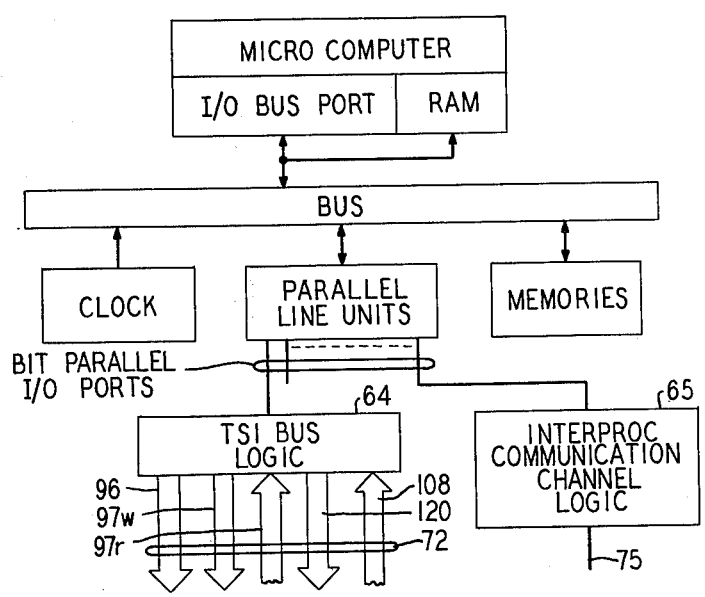
FIG. 5 is a simplified block diagram of a processor that is useful in the network of FIG. 2.

The partition processors, e.g., processors 70 and 71, can be of any appropriate type for performing the time division switching network control types of functions, which functions are of types now well known in the art. Details of such processors and their basic control functions comprise no part of the present invention, but they will be herein illustratively outlined to the extent necessary to illustrate the manner of operation of the present invention. For example, each processor advantageously includes an LSI-11 (PDP11/03) processor, herein sometimes called a computer to distinguish it from the overall processor in which it is used, as commercially supplied by the Digital Equipment Corporation and as outlined in the lsi11 pdp11/03 *Processor Handbook,* copyright 1975, by Digital Equipment Corporation. Such a processor operates as a minicomputer by executing network control routines in accordance with a variety of well-known logic and arithmetic instructions. As shown in FIG. 5, such a processor typically includes a bus for providing clocked interface among a microcomputer, with its random access memory, and the various additional memories and I/O interface circuits for interfacing the bus with different types of peripheral units. A DRV-11 parallel line unit is one such I/O interface unit indicated in the aforementioned processor handbook, and it includes logic to control bit-parallel access to the bus among a plurality of such units. On such line unit advantageously provides the I/O port interface for a block of TSIs in the illustrated A network by way of the bus 72, another such line unit does the same for a block in the duplicate B network by way of bus 73, and a third serves the interprocessor communication channels on circuit 75. Also indicated in FIG. 5 are two logic circuits 64 and 65 of any suitable type known in the art for coupling the asynchronously operating processor with the remainder of the partitioned switching network. Techniques are well known in the art for the indicated coupling and for effecting communication between a first machine and a plurality of additional machines by way of a time-shared bus, e.g., bus 72 or circuit 75 in partition control section 76 of FIG. 2. Hence the present description of logic circuits 64 and 65 is primarily designed to outline the character of the communication between machines in the illustrative embodiment and to indicate the times when such communication is effected. The relationship of those times to the system time base will be discussed in relation to FIGS. 6A and 6B.

Thus, logic circuit 64 is a TSI bus logic circuit that advantageously includes buffer registers (not separately shown) into which the processor loads a message for accessing either the control memory of a TSI or the network control channel time slots of that TSI. This loading, and the subsequent use of any response information, in the registers are handled by the processor at appropriate times in its operating sequence. Reception of the message in a particular TSI control memory and provision of any response by such memory are handled by the TSI during the control channel time slots since the TSI is not then performing call switching functions. The mentioned message includes fields identifying such things as which TSI is to be accessed and whether the control memory or the control channel is to be accessed. In the case of control memory access, there are additional fields in the message designating whether a memory read or write operation is sought and designating the memory address (i.e., time slot and phase location) to be accessed; and there is a data field for supplying data to be written in the addressed location for a write operation or for receiving data from the addressed location for a read operation. In the case of control channel access, there is an additional (beyond the TSI name and read/write fields) field designating which port of the TSI is to be used and a data field for supplying a submessage (similar to the message already outlined for a TSI control memory) to controlled equipment control memories in other network stages or for receiving such a submessage from such memories theretofore interrogated.

Interprocessor communication channel logic circuit 65 includes buffer registers and associated logic well known in the art for accomplishing data format conversions between the bit-parallel format of the processor and the bit-serial format of the network. That logic circuit also provides coupling with the processor of the partition at appropriate times in the processor operating sequence and with the network during communication channel time slots that are assigned (in a manner which will be described) for communication with other ones of the respective processors in the system. In order to avoid interprocessor communication blocking, separate sets of such registers are advantageously provided in each circuit 65 for the respective interprocessor channels. In operation, the partition processor provides to its circuit 65 the message which is to be transmitted, a designation of the time slot of the communication channel to the processor that is to receive the message, and a start signal. The circuit 65 then sends the message in appropriate time slot byte segments as will be further discussed in regard to FIG. 6B. Similarly, for message reception the circuit 65 stores the plural message bytes and signals the partition processor that a message has been received in a certain communication channel time slot.

As is well known in the art, two processors are advantageously employed in a working-standby arrangement for each partition processor, and they share a common memory. However, for purposes of illustration only a single such processor is indicated for each partition in the present application.

Although one processor of the identified type is capable of handling all of the call signal processing functions for a partition of the illustrative network, it has been found to be advantageous to separate out certain low level functions in order to make the overall operation of the network more flexible. These functions for the illustrated embodiment are those which must be recurrently performed, and can, therefore, consume substantial machine time. By separating them into other machines, more machines of smaller individual size and cost are used and the whole system is rendered more flexible.

One of the functions thus separated out for the illustrated embodiment is a scanner, designated SCAN, for each partition; and two such partition scanners 82 and 83 are shown coupled to network-edge-side ports of the additional stage blocks 33 and 34. A spare scanner 84 is similarly coupled to block 37. The partition scanners 82 and 83 work exclusively with the partitions controlled by the partition control sections 76 and 77, respectively. The scanners are connected through the network, in time-space paths controlled by their respective partition control sections, for detecting changes in switchhook state on line interface units in IUBs assigned for control to the same partition as the scanner. Likewise, the scanners report state changes to the partition processor by way of interprocessor communication channels through the network 23.

The scanning processor is clocked (by circuits not shown) in synchronism with a predetermined LIU scanning sequence; and when each such LIU is scanned, the processor compares the information received with the scan word from the preceding scanning cycle. If there is a match, no further action is taken with respect to that LIU. If there has been a change, the SCAN processor makes up a message of old and new status information, the time slot number involved, and the sample frame number involved (it will subsequently be seen that the frame number indicates the LIU number) and sends that message to the partition processor of the same partition through its interprocessor communication channel. In addition, the SCAN processor overwrites the old status information with the new changed information. The SCAN processor also operates on command from its partition processor, to use the scanner reverse channel (the reverse direction of communication in the scanning time slot to be described) to the line interface unit for ordering that unit to switch to the service state. An LIU in the service state can provide a service processor, which is thereafter coupled to the LIU, appropriate service and status information signals.

Another of the functions which is separated from the partititon processor is that of providing service circuit functions. These functions are typically performed by plural service processors, otherwise designated SERV in FIG. 2, for each partition. To avoid unduly complicating the drawing, two partition service processors 85 and 86 and a spare service processor 94 are shown, and they are connected to blocks 34, 33, and 37, respectively. Such a service processor generally functions for any one of a large group of circuits and is connected to work with individual ones of such circuits on command from its partition processor. The path for providing the service is set by the partition processor at the time of need.

A service processor, e.g., 86, is connected via a 2-way interprocessor communication channel through the network to a partition processor to which it has been assigned. The service processor receives commands from and reports results to its partition processor. In addition, the service processor provides various tones to an LIU with which it is connected and receives voice channel signals from the LIU as previously outlined. In addition to those voice channel signals, when a connected LIU is in its service state, the service processor receives switchhook and other LIU status information on a subchannel of the LIU voice channel (using an occasional 9th bit of the data as described in the aforementioned McDonald paper). By this means the service processor can be apprised of the status of the subscriber station set in case that status should change during the performance of the appropriate service function.

In performing the service functions, the service processor advantageously cooperates with a time-shared digital filter as described in the McDonald article and application. In this cooperation the service processor receives a command from a partition processor directing the performance of a particular service function in a particular time slot, sometimes called a service processor channel. The service processor refers to its own memory on a table-look-up basis to translate that command to a set of data defining certain word locations in the time-shared digital filter control memory, which locations contain the correct sequence of information, i.e., the correct filter coefficients and connections in the proper time intervals to perform the directed service function. Many different signal examination and signal generation functions can be performed by a time-shared digital filter. The examination functions of principal interest here include examining a received voice channel signal for a certain signal characteristic, such as off-hook in the presence of ringing or a pushbotton dialing signal. The generation functions of principal interest include the generation of dial tone, busy tone, ringing tone, and audible ring tone to be applied in the voice channel to the connected LIU.

A still further function which is advantageously separated from the partition processors is the function of providing a translation facility, and this function is performed by a translation processor 87 which is coupled to the network-edge-side of block 37 in stage 31. The functions provided by processor 87 are similar to those set forth in "Translations in the No. 1 Electronic Switching System," by W. Ulrich and Mrs. H. M. Vellenzer, *Bell System Technical Journal*, September 1964, pages 2533-2573. Only a few of the translations are mentioned here which are useful in describing illustrative operations of the partitioned system here under consideration. For example, the translation processor receives, through the network in an interprocessor communication channel from one of the partition processors, a message identifying the directory number of some LIU, or of other equipment, connected at or near the edge of the network. In response to such a message, the translation processor 87 provides a return signal indicating the equipment number corresponding to the received directory number, as well as providing other relevant information to be used by the partition processor and including, for example, the class of service to be provided and the name of the network partition which controls the equipment in question. The translation processor also advantageously includes a duplicate of the resource list of each working and spare partition processor.

In the case of each of the scanning, service, and translation processors just mentioned, each advantageously comprises a commercially available processor of the type previously indicated for the partition processor, i.e., in FIG. 5. Functions performed by each such processor are of a type well known in the art and are also described for the scanning and service processors in the aforementioned McDonald article. The principal difference between processors indicated here and those known in the prior art is that the processors indicated herein communicate with one another and with controlled network circuits through a partitioned call switching network rather than through a monolithic call network or a separate interprocessor network.

The translation processor uses an interprocessor communication channel logic circuit like the circuit 65 of FIG. 5. SCAN and SERV processors each require a single-channel version of circuit 65 designed to work over a single time slot between the processor network port and a parallel line unit of the processor's computer. In addition, the SCAN AND SERV processors each must interface single bytes between their respective network ports and a separate parallel line unit of their respective computers, i.e., scanning and "reverse channel bytes" for SCAN processor and data flowing to and from the time-shared digital filter equipment of the SERV processor during the voice channel time slot and its ninth bit time subchannel. The latter interface for the SCAN processor is provided basically by the usual type of scanner memory and logic using the processor's computer for access to the interprocessor communication channel. Such interface for the SERV processor is basically the time-shared digital filter already described.

FIG. 4 is a diagram of one suitable time slot interchanging arrangement for interchangers such as the interchanger 63, of FIG. 2. The interchanger of FIG. 4 is an unfolded more detailed representation of a part of the folded network stage 32 depicted in FIG. 2. In order to indicate more clearly the relationship between the interchanger of FIG. 4 and circuits of FIGS. 2 and 5, circuit elements which are the same as or similar to those used in FIGS. 2 and 5 are designated by the same reference characters.

At the left in FIG. 4, input signal paths of the links from the additional network stage 31 to the illustrated time slot interchanger are indicated, and two such paths 60IN and 62IN couple bit-serial input data signals to shift registers 88 and 89, respectively. Similarly, at the right in FIG. 4, output paths of the links to stage 31 are shown as paths 60OUT and 62OUT for sending bit-serial data outputs of two further shift registers 90 and 91, respectively, to stage 31. Bit rate shift clock signals are applied from the clock source 20 in FIG. 1 to the shift registers 88 and 89 by way of a lead 92 and to the shift registers 90 and 91 by way of a lead 93.

In the upper part of FIG. 4 a bit-parallel, 2-way bus, including one-way extensions of a TSI input bus 108 and output bus 120, provides bit-parallel communication (through logic circuit 64 of FIG. 5) to and from an I/O port of the partition processor 70 for communication in control channel time slots with control memories in other network stages throughout the partition. At the bottom of FIG. 4, a bit-parallel bus 96 supplies address signals from the same I/O port of the partition processor 70; and a writing bit-parallel bus 97w supplies data from the same I/O port of processor 70 for writing a control memory 98 at addresses indicated on the bus 96, whereas a reading bit-parallel bus 97r transmits memory readout to the processor 70 for purposes of memory content auditing. The buses 96, 97r, 97w, 108, and 120 are part of bus 72, as shown in FIG. 5. Separate bit-parallel buses 99 and 100 extend from control memory 98 to address signal inputs of buffer random access memories (RAMs) 101 and 102, respectively. Such a RAM is loaded in bit-parallel in time slot and phase sequence and unloaded in bit-parallel in the interchanged time slot and phase information sequence as will subsequently be further described. One such RAM loads in the fashion outlined while th other unloads and vice versa.

Input shift registers 88 and 89 are continuously loaded in bit-series from their respective input circuits at the bit rate of data on such input circuits. At the end of each incoming time slot, a clock pulse TS(IN) at the TSI input time slot rate from office clock source 20 causes the shift register contents to be transferred to buffer registers 104 and 105 coupled to the shift registers 88, 89 in FIG. 4. The shift registers are then free to receive additional incoming data in the next time slot. Buffer registers 104 and 105 are unloaded in bit-parallel by way of respective sets of clocked AND gates, each set being schematically represented by a single gate such as the AND gates 106 and 107. For an interchanger having $n$ input shift registers, the gate sets of the group including gates 106 and 107 are clock enabled in $n$ different phases of each time slot to multiplex the contents of the respective buffer registers 104, 105 to the time slot interchanger input bus 108 for application to one of the RAMs 101 or 102, or to the partition processor 70. Employment of buffer registers 104 and 105 permits the n-phase unloading onto bus 108 without interrupting signal flow into registers 88, 89.

The n-phase clock signals are advantageously derived from the bit rate clock signals on lead 92 by a circuit 123 that selects $n$ pulses per time slot from lead 92 for driving an $n$ counter 126. That counter is periodically reset by TSI input frame rate signals from office clock 20, and the counter output is translated by a decoder 127 to a one-out-of-n-leads-energized format for use on bus 109 to operate gate sets 106, 107 in sequence. Similar logic 128 derives $n$ clock signal phases from lead 93 signals. Logic circuit 128 is synchronized by TSI output frame rate signals from clock 20. The aforementioned frame rate signals applied to counter 126 and to logic circuit 128, respectively, are advantageously displaced in phase with respect to one another by sufficient amount to assure that there is an integral frame phase difference between transmitted and received signals at LIUs in stage 30. The signals from logic circuit 128 are utilized for enabling buffer registers 110 and 111 for loading from the output bus 120 into shift registers 90 and 91. After all outgoing buffer registers 110,111 have been loaded, a TS(OUT) pulse on lead 113 from office clock 20 enables transfer of the buffer register data into the outgoing shift registers 90 and 91, and the shift registers begin transmitting the new outgoing data to stage 31.

It will be apparent to one skilled in the art that there are other methods by which the network data may be transferred from incoming shift registers to RAM buffer and from RAM buffer to outgoing shift registers, than by the use of the intermediate buffer registers 104, 105 and 110, 111. For example, the incoming and outgoing shift registers could be extended by different numbers of additional bits to compensate for the different amounts of time it takes to transfer an incoming byte from different shift registers to a RAM, or to transfer an outgoing byte from a RAM to the different shift registers, in the $n$ phases of a time slot. Such different transfer times arise from the use of different clock phases to couple signals from the different shift registers to the RAMs in order to avoid interference. Yet another design that could be used would be to subdivide each RAM buffer into $n$ equal-sized pieces, organized so that each incoming shift register was connected to just one such piece; in this design, the buffer registers coupled to the incoming shift registers could be eliminated, because all incoming data in one time slot could be transferred simultaneously from each shift register to its corresponding piece of the receiving RAM buffer.

Signals on the multiplexed input bus 108 are coupled in bit-parallel to the RAMs 101 and 102 in alternate call signal sample frames. Low frequency clock signals from the office clock 20, and occurring at one-half the TSI output sample frame rate, are coupled directly to enable loading of RAM 102 and are coupled through an inverter 116 to enable loading of the RAM 101. This arrangement effects the loading of RAMs 101 and 102 alternately from sequential sample frames. Signals on bus 108 are available during the final two time slots of each sample frame to the partition processor as previously described. Since those two time slots are the control channel, they are not assigned for subscriber calls.

Memory 98 operates in synchronism with the n-phase time slot clock signals from bus 109 for supplying loading address signals to RAMs 101 and 102 by way of buses 99 and 100, respectively. Memory 98 similarly operates in synchronism with the n-phase clock signals from logic circuit 128 for supplying unloading address signals. Each of those buses 99 and 100 provides alternately, but in opposite sequence to the respective RAMs, a first set of addresses for loading its RAM locations and a second set of addresses for unloading the RAM. The first set addresses the RAM locations sequentially for loading from the n input shift registers 88, 89 in a recurrent sequence in the n phases of each time slot until a full sample frame of the signals from input bus 108 have been loaded in the order received. The second set of addresses, applied in the next sample frame, enables the unloading of the RAM to output bus 120 in the time slot and time-slot-phase sequence of addresses specified by control memory 98 in the direction of the peripheral processor. Control memory 98 provides the two sets of addresses alternately to each of the buses 99 and 100, and the half-frame-rate clock signals enable the RAMs alternately to load from bus 108 when receiving the first set of addresses.

AND gate sets schematically represented by gates 118 and 119 are enabled in opposite phases to interleave sample frames of signals from the RAMs 101 and 102 to an output, or demultiplexing, bus 120 of the time slot interchanger. The half-frame rate clock signals are applied directly to gate 118 so that RAM 101 is unloaded at the same time that RAM 102 is being loaded. Similarly, those clock signals are applied through inverter 121 to gate 119 for unloading RAM 102 while RAM 101 is being loaded. The unloading operations effected by gates 118 and 119 take place in all but the last two time slots, the control channel, of each sample frame; and, during those two time slots, the demultiplexing bus 120 is available to receive signals from the partition processor. During those control channel time slots, gates 118 and 119 are inhibited by a periodic signal on a lead 112 from office clock 20. The n phases of the time slot clock signals from the logic circuit 128 enable the respective output buffer registers, e.g., 110 and 111, for loading in the same recurring sequence in which their corresponding input registers 104 and 105 are unloaded in each time slot. The bit rate shift clock on lead 93 actuates shift registers 90, 91 continuously for coupling the shift register contents in bit series to the respective time slot interchanger output paths 60OUT and 62OUT.

In order to employ the preferred implementation of LIUs of the type described in the McDonald paper, it is necessary that incoming and outgoing time frames be aligned at the network edge ports, i.e., at the LIUs. Therefore, to compensate for various transmission delays in the network, the incoming and outgoing time frame, as represented by the aforementioned frame reset signals for counter 126 and circuit 128, are offset at the intermediate stage TSIs. In particular, the outgoing frame leads the incoming frame by the round-trip network delay (excluding the TSI). The length of this delay may be substantial in a large network, e.g., three time slots (out of 64). Use of buffer registers at the TSI input and output shift registers actually requires the input and output frame reset signals, that synchronize the n-phase loading and unloading of the RAMs, to be five time slots apart in order to achieve the three-time-slot lead across the TSI. Thus, when signals for time slot 63 (using decimal notation in a series beginning with No. 0) are being read from a RAM, e.g., 102, to buffers 110, 111, the signals for time slot 62 are being shifted out of shift registers 90 and 91. Since a three-time-slot lead is required across the TSI, the signals for time slot 59 must be then shifted into input registers 88 and 89. That means that the signals for time slot 58 are being written from input buffers 104, 105 into RAM 101. Thus, the differential across the RAMs is 63−58=5 time slots difference between input and output frame reset signals to get a three-time-slot lead effect across the TSI.

Switches between read and write functions in the RAMs advantageously take place at the end of each frame, i.e., at the end of time slot 63 at the RAM output (time slot 62 at the output shift registers 90, 91), because the RAM that is then outputting is clear of all readout and can start reloading. However, the next time slot signals that it has available for loading are the time slot 59 signals at the RAM input. As a result, the signals for RAM input time slots 59 through 63 are loaded into a different RAM from that in which the signals for time slots 0 through 58 of the same frame had been loaded; and the time slot 59 through 63 signals will get to the edge of the network after two frames of delay, with respect to inputs at the network edge of origin, instead of the signal frame of delay experienced by the rest of the frame. That difference in frame delay is not consequential in ordinary voice signals. Nor does it affect the control channel signals (time slots 62 and 63) which pass between a network stage and a partition processor at the center of the network and thus bypass the RAMs. The difference in frame delays does, however, make a difference if frame counts are important, as in the interprocessor communication channels to be described, so a partition processor doing a path search to set up such channels must exclude from use the last five time slots of a frame.

Preventing the aforementioned last two (control channel) time slots per frame from being assigned for call connections is advantageously handled by marking them busy in the partition processor link map. Otherwise, buffer RAMs are loaded regularly, as already described, as though there were no input/output frame phase displacement. They are similarly unloaded except for the inhibit in time slots 62 and 63 to avoid interference with control channel signals on bus 114.

It can be seen from the preceding discussion that the interchanger of FIG. 4 performs as both a time and a space switch. That is, the interchange of signals among time slots is a time switching function. However, the interchange of signals among phases of a time slot (the order in which shift registers are loaded or unloaded) allows a signal that came in on link 60 to go out on line 62; and that is a space switching function. In addition, the combination of functions in the one network stage allows a single incoming signal to be easily distributed to plural outgoing channels.

Figure 6A:
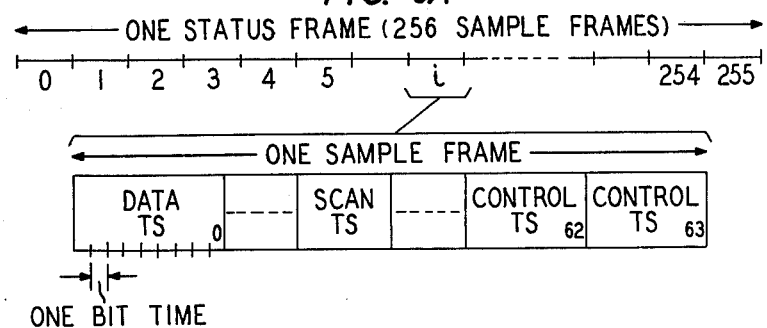
FIGS. 6A and 6B are time base diagrams illustrating operation of the network of FIGS. 1 and 2.
Figure 6B:
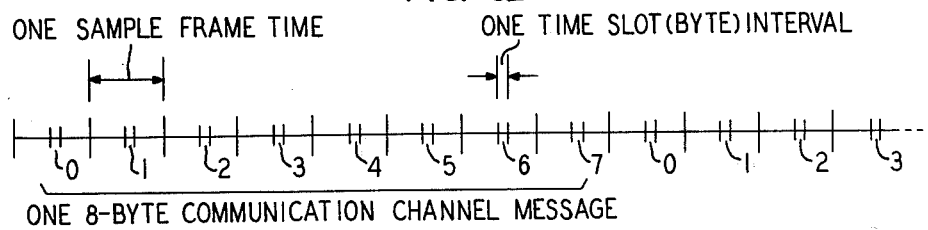

FIGS. 6A and 6B are time base diagrams illustrating different forms of communication in the time division switching network of the present invention. A time scale across the top of the diagram in FIG. 6A depicts 256 sequential sample frame intervals in a larger, or superframe, interval hereinafter designated a status frame. Only 240 intervals of a status frame are required for the present illustrative embodiment. A sample frame is the recurrent time interval for communication of a single differential pulse code modulation (DPCM) sample of a call signal for each of a predetermined number of calls in different time slots of the frame. Illustratively, each time slot sample includes nine bit times which can include binary coded DPCM information about the amplitude of a call signal or which can include other control information to be described. There are advantageously 64 time slots per sample frame, and the sample frame rate is usually somewhat higher than the Nyquist rate for the analog signal, i.e., at least twice the highest call signal frequency which is to be transmitted.

Each sample frame time includes certain time slot intervals which are dedicated to control purposes. One of these purposes is use as a scanning time slot. Thus, for any given inteface unit block of, e.g., 240, LIUs served by one time division highway, there are 240 sample frames used in one status frame since the status information for each LIU of an IUB is transmitted in the scanning time slot of a different sample frame of a status frame. Certain other time slots of each sample frame are used for other known call signal purposes; and FIG. 6A illustrates those other purposes which are useful in a consideration of the operation of the partitioned network of the present invention. For this purpose, the time scale of one sample frame in FIG. 6A is expanded to show various time slot uses.

The principal utilization for time slots in a sample frame is, of course, for the transmission of data signals digitally representing analog call signal samples. Only one data signal time slot is shown in FIG. 6A for convenience of illustration, but it is to be understood that many other time slots are similarly utilized in each sample frame. The nine bit times of a time slot are indicated across the bottom of the box utilized to represent a data time slot. Any data time slot assigned for a particular call connection will normally retain that assignment for the duration of that call connection.

A scanning time slot is also shown in FIG. 6A, and each occurrence of such scanning time slot in a status frame is utilized for a different LIU as hereinbefore noted. In the scanning time slot, the forward transmission direction, i.e. the direction of transmission from an LIU to its SCAN processor, is utilized as mentioned to transmit status information about the LIU. The reverse transmission direction, i.e. from SCAN processor to the LIU, is utilized for transmitting control signals from the SCAN processor to the LIU for setting the states of various circuits in the LIU as described in the aforementioned McDonald application and article.

The previously mentioned control channel comprises two time slots, e.g. 62 and 63 in decimal—76 and 77 in octal, near the end of each sample frame. That channel is employed for communication between a partition processor and control memories controlled by it in network stages 30 and 31. In transmission from the partition processor to a control memory, the processor transmits an address code identifying the particular control memory which is to respond, an operation code defining the manner of response, a data message which includes an address within the control memory which is to be affected, and any data which is to be stored at that memory address. The address code naming a control memory requires only a single bit in the illustrative embodiment of FIG. 2 because, once a circuit path to any given memory has been set through the network, there are at most only two control memories that can receive the code, i.e. the memories coupled to that particular path in stages 30 and 31. In transmissions from the control memory to the partition processor, the information transmitted includes the name of the transmitting control memory, its internal memory location which was the source of the transmitted data, and such data from the control memory.

Because the control channel between a partition processor and an IUBC is switched through additional stage 31, it is necessary that such a control channel be switched to a particular IUB before such channel can be used. If the concentration at stage 31 is sufficiently low, 2:1 or less in the described network, then sufficient number of links between stages 31 and 32 exist (using both the A and the B network) that such control channels may be set up on a semi-permanent basis, so that it is not thereafter necessary to switch such channels for communication with different IUBCs. On the other hand, if a higher concentration ratio is used at stage 31, then it is necessary to make certain that the desired channel exists before any particular IUBC is sent commands. In what follows, therefore, whenever it is stated that a partition processor issues a command to an IUBC, it is assumed that the appropriate control channel has been set up, either on a semi-permanent basis or on a switched-at-need basis, as the case requires.

A communication channel is provided for communicating among various ones of the partition and other processors which make up the common control for the illustrated network. This channel is illustratively implemented, for each pair of processors that must communicate, by selecting a set of links that constitute a wire path through the network between those processors, and dedicating an available time slot on each such link for use in the channel between those processors. For example, circuit links 75, 60, 62, and 80 constitute a path between processors 70 and 71; and links 75, 60, and 74 constitute a path between partition processor 70 and SCAN processor 82. The latter path could be completed if a first time slot were available on links 75 and 60 between processor 70 and interchanger 63, and a second time slot were available on links 60 and 74 between interchanger 63 and SCAN processor 82. On any selected link, eight sequential recurrences of the dedicated time slot constitute eight message byte intervals of a communication channel message as shown in FIG. 6B. Successive recurrences of that message interval are indefinitely dedicated for use by a single processor pair as though the time slot used had been assigned to a call of indefinite duration between two subscribers. The use of 8-byte message framing is for the convenience of use by the processors employed in the illustrative embodiment and which typically operate on an 8-byte basis. A particular message starts at any sample frame number which is a multiple of eight and extends for seven additional bytes thereafter.

Although a partitioned switching network performs substantially all operations of other switching networks, only a few need to be described here in order to illustrate the operation and the potential for the partitioned network. These illustrative operations include one for setting up a call connection between two subscriber stations, one for taking down such a call connection, and one for substituting a spare control section 78 for one of the other control sections as would take place in the event of a faulted partition processor. For all of these operations it is necessary to have established interprocessor communication paths through the network both for accomplishing needed changes therein during network operation. Various initialization procedures are known in the art for multiprocessor systems. In the illustrative embodiment the presently preferred initialization procedure is to have the partition processors operate autonomously when turned on to obtain from translation processor 7 an assignment as a working or a spare partition processor and, if a working processor, to obtain the list of resources (controlled equipment, e.g. IUBs, SCAN processors and SERV processors) constituting the partition and to obtain the list of network ports and time slots through which it thereafter establishes communication channels to other processors of all kinds in the system.

In the course of setting up any communication path, a partition processor must determine an available time-space path through its partition of the network in a manner which is now well known in the art for time division multiplex networks. One such technique involves reference to a link and port utilization map in partition processor memory to identify an available path. Thereafter, the partition processor causes each network center-to-edge part of a path so identified to be set up by communicating to appropriate control memories in the aforementioned control channel through the one of its time slot interchangers having access to the selected path. First, the processor directly communicates with the control memory of its selected time slot interchanger for establishing correct TSI control memory time slot and phase location addresses to couple signals from the desired input link to the desired output link. Next, the control channel is employed, in the correct interchanger output phase to reach the desired output links, to transmit a message addressed to the control memory, e.g., memory 40, of the switch in stage 31 which is linked to the selected output shift register of the time slot interchanger. This message identifies the time slot to be used for the call connection and the particular gates to be actuated in that time slot in multiplexer 38 and demultiplexer 39 of that switch. Next, the partition processor again utilizes the control channel and addresses a message to the IUBC of the IUB in stage 30 that is at the network edge of the selected call path and directs that IUBC to connect a particular LIU to the time division highway 17 in a designated call time slot. Of course, this latter step in the process of setting a call path is not necessary if the path is to extend to one of the SCAN, or translation processors connected to edge side ports of stage 31. However, in the case of a SERV processor (which it will be recalled includes a time-shared digital filter) the partition processor must direct the SERV processor to connect a certain one of the SERV process channels in a certain time slot on the network port used by the SERV processor.

SET UP CALL CONNECTION

Assuming the foregoing procedure for setting a path in a partition of the network, the following is an outline of the steps followed in the partitioned network for setting up a call connection when a subscriber station, such as the subscriber station 10 in FIG. 1, goes off-hook. Since basic call setup procedures are well known in the art, the example here assumes a call between subscribers in different partitions.

1. When the calling subscriber goes off-hook, the change in its line state is registered at its LIU, and the changed state so registered is transmitted during the corresponding sample frame scanning time slot as outlined in connection with FIG. 6A to, e.g. the SCAN processor 82.

2. SCAN processor 82 records the status change and sends a message to partition processor 70 over the 8-byte interprocessor communication channel used between those two processors. The message includes for the LIU its time slot and frame number thereby indirectly indicating the IUB number and LIU number, respectively; and the partition processor converts the time slot number to a stage 31 port number. That message also includes for the LIU the old status, the new status, and a limited amount of translation information such as whether the line involved has rotary or pushbutton dialing service.

3. If the limited translation information is insufficient, e.g., if the LIU actually serves a two-party line instead of a single subscriber line, the partition processor interrogates translation processor 87 for more information. If the limited translation information is sufficient, processor 70 determines and sets a path between the calling LIU and one channel of the SERV processor 86. Processor 70 also directs SERV processor 86, over their communication channel, which process to provide on such SERV channel and in which time slot. For example, processor 70 initially directs the SERV processor to initiate for that channel a service routine for supplying dial tone to the LIU and for collecting dialed digits. The service processor automatically, in accordance with that routine, removes dial tone upon receiving the first dialed digit. In addition, processor 70 directs the SCAN processor to order the LIU to switch to the service state and thereby activate the control subchannel multiplexed on the 9th bit time of the voice channel used between the SERV processor and the LIU. In that subchannel the LIU provides one bit of line state information to allow the SERV processor to receive the hook state information, also otherwise provided to the scanner, so that the service processor will note and respond to an abort, e.g., the subscriber hanging up before completing the dialing information.

4. SERV processor 86 utilizes the communication channel to partition processor 70 to send collected dialed digits to that processor either individually or in groups for digit analysis.

5. Processor 70 determines the end of a dialing sequence, terminates the previously initiated routine in the SERV processor 86 by a message on the communication channel, and transmits the dialed information over its communication channel to TRANSLATION processor 87 with an operation code requesting translation of the dialed information.

6. In response to the dialed digits, TRANSLATION processor 87 returns on the same communication channel a digital code sequence defining the service characteristics, including partition identification, for the network port equipment named by the received dialed digits, i.e., the called LIU.

7. If processor 70 recognizes from the translation report that the called LIU is in the same partition as the calling LIU, it then proceeds to identify a free time-space path to the called LIU and proceeds with the necessary steps to establish a call connection between the LIUs in a fashion that is well known in the art.

8. If processor 70 recognizes from the translation report that the called LIU is in a different partition, e.g., that controlled by processor 71, the processor 70 determines, in accordance with prior art pathfinding techniques, various possible paths between its SERV processor 86 and that network-edge-side port to which the IUB containing the called LIU is attached, with the additional requirement that each such possible path must also pass through the same TS1 used in the previously established path between the calling LIU and the SERV processor 86. (It would also be possible to connect the called LIU and the SERV processor through a different TS1. However, such a connection would complicate the subsequent establishment of connection between the called LIU and the calling LIU, and to little advantage, because the network blocking performance for the described network is satisfactory even though the path hunt be limited to a single TS1.)

9. Processor 70 sends a request message on its 8-byte communication channel to processor 71 identifying the called LIU and the various time slots at the network-edge-side of stage 31 that are available in switches controlled by processor 70 for reaching the called LIU. If there are more time slots than will fit in an 8-byte message, the excess is held till a response to a first message is received. The same message also contains an operation code which requests processor 71 to make the following determinations:
   a. Is the called LIU available or busy?
   b. Can a connection be made to the called LIU through a time slot that matches time slot information supplied by processor 70?.

10. In the course of satisfying the foregoing request, processor 71 responds to processor 70 with one of the following operation code response messages:
   a. Called LIU is busy;
   b. Called LIU is available, but there are no available time slots to match those on your list; or
   c. Called LIU is available, and the following time slot between stages 30 and 31 has been set for your call.

11. If response message (a) or (b) is received by processor 70, either it sends another request message (if there are more free time slots to be tried) or it instructs SERV processor 86 to send busy tone to the calling LIU and monitor that LIU for an on-hook state. This terminates processing of this call attempt.

12. If the response message (c) is received by processor 70, it sets up the balance of the path between SERV processor 86 and the called LIU, which path is chosen to match the selected time slot at the called IUB network-edge-side port.

13. Processor 70 directs SERV processor 86 to initiate ringing to the called LIU and monitor that LIU for an off-hook condition. Processor 70 also directs SERV processor 86 to send audible ring to the calling LIU and to continue to monitor that LIU for status change to on-hook (abort the call).

14. When the called LIU goes off-hook in answer to the ringing (or if the calling LIU aborts), SERV processor 86 terminates ringing to the called LIU and sends a corresponding report to processor 70.

15. Processor 70 returns a message to SERV processor 86 to terminate audible ring to the calling LIU.

16. Assuming that the ringing termination was due to a called LIU answer, processor 70 connects the calling LIU to the called LIU by rewriting with appropriate data the appropriate control memory locations in that TS1 through which both LIU-to-SERV paths pass.

17. Processor 70 releases the two half-paths between SERV processor 86 and the TS1, marks the appropriate links to stage 32 "idle" in its link status map, and marks the corresponding SERV processor 86 processes "idle" in the partition processor resource list.

18. Information to be used for billing is provided to associated message accounting facilities, not shown; and the calling and called LIUs again come under the sole supervision of the SCAN processors of their respective partitions.

TAKE DOWN CALL CONNECTION

The following is an outline of the sequence of steps to be followed in the partitioned switching network in order to take down an existing call connection:

1. When either the calling or called LIU registers an on-hook condition for its subscriber, that event is detected by the SCAN processor of the corresponding partition and reported to the appropriate partition processor. Assume that the called LIU first goes on-hook.

2. Processor 71, which controls the partition of the called LIU, determines from its call memory that a part of the call connection was under the control of the partition processor 70, and it sends a message to that processor reporting the on-hook state of the called LIU.

3. Within an appropriate delay interval, the calling LIU should go on-hook, and its SCAN processor 82 then reports that fact to processor 70, which in turn reports that fact to processor 71.

4. At this time processors 70 and 71 take down the portions of the talking path under their respective controls and clear records of that path from their maps of their respective partition parts of the network. The processor 70 which controls the partition of the calling LIU provides an appropriate set of billing information.

TRANSFER OF CONTROL BETWEEN PARTITION CONTROL SECTIONS

It was previously indicated that a processor, or other partition control section, fault can initiate a routine in which a spare control section replaces the faulty control section. Of course, if a computer in a processor fails, its standby computer sharing the same memory would usually take over automatically. If there is a bus fault at a processor I/O port, the processor can still operate without that particular port, but its capabilities are reduced and a maintenance routine would be initiated to switch partition control sections to facilitate such a routine. However, if through some catastrophe the entirety of buses 72 and 73 were open circuited, perhaps including the circuit 79, alarms would be actuated at the SCAN, SERV, and translation processors when they fail to get appropriate responses to reports, as is usual in computer interconnection systems and maintenance procedures. Accordingly, either a human or a machine maintenance procedure would be initiated. If a machine procedure is assumed, a variety of such procedures are available and well known in the art. For example, another working partition processor is triggered by an alarm to identify from the alarm the partition processor which is out of service. That identifying processor then reports its own name to the translation processor 87 along with the name of its communication channel on which the trouble was found. Still assuming a serious trouble, translation processor 87 identifies partition circuits beyond stage 31 controlled by the failed partition processor, identifies a spare partition control section, and sends resource list messages to that spare partition control section defining the partition where the processor failed and identifying SCAN and SERV processors to be used so that the spare facility can begin processing calls. Call set-ups and take downs in progress as fault time are lost for such a serious failure.

However, a more usual case is that of a circuit, e.g., one of a duplicated pair of partition processors, failure which reduces but does not destroy the capability of a partition processor to process calls. In that case, maintenance routines indicate the trouble and initiate a similar, but more gradual, takeover by the spare partition control section as outlined in the following steps:

1. Assume that the "failed" control section includes processor 70. Its maintenance interrupt routine causes it temporarily to stop call processing and send a command to its SCAN processor 82 to stop sending scanner messages.

2. Processor 70 also sends a message to translation processor 87 advising that processing has stopped and requesting that a spare control section take over call processing in the remainder of the partition of processor 70.

3. Translation processor 87 picks a spare control section and directs it to start operation as a working section. The spare section processor interrogates TRANSLATION processor 87 to identify an available SERV processor, e.g. 94.

4. The spare section processor sets a communication channel to that spare SERV processor 94.

5. The spare section processor then returns a message to processor 70 confirming that new connections for call service have been established, and processor 70 returns a further message to the spare section processor directing the connection by the spare of a communication channel to the SCAN processor 82 of the failed processor 70.

6. The spare section processor sets the indicated connection to SCAN processor 82.

7. Processor 70 transmits to the spare processor the indentification of IUBs theretofore controlled by processor 70 and the status regarding the time slot occupancy of the corresponding IUB links to stage 31, as well as any other related information. This partially establishes the partition link map and the resource list information in the spare processor.

8. The spare section processor connects control channels to the IUBs identified in step 7 and then commands SCAN processor 82 to resume transmission of messages so that the spare section processor can begin picking up new calls.

9. Processor 70 transmits messages to all other partitions indicating that any future interpartition messages destined to processor 70 must go to the spare section processor. (This assumes that on call setup, a partition processor includes in its partition map the name of any other partition processor involved on the call so that the latter processor can be informed later, without further reference to translation processor 87, when the call is being taken down.)

10. Processor 70 disconnects its control channel paths to its IUBs; and it disconnects its communication channel paths to other partition processors, except the spare processor to reduce the possibility of accidentally introducing irrelevant signals into active call processing prior to repair of the disabled partition control section.

11. Processor 70 resumes processing for draining any message queues that may have received messages during the initialization of partition control section transfer. However, processor 70 has inputs from only its own SERV processor 86 and the spare control section 78 so that the processor 70 is limited to (a) finishing the setup of calls for which setup had been in progress, and (b) taking down calls as requested by the spare section 78 processor.

12. The spare processor receives SCAN processor messages and messages from other partition processors. If such messages might refer to calls already in progress before control section 76 became disabled, i.e. spare section processor has no call record information about the LIU in question, the spare processor assumes such messages may refer to calls controlled by processor 70 and transmits the new information to that processor. If processor 70 determines, by reference to its call record that it can use the new information to process old calls, it does so. Otherwise it replies to the spare processor that the message does not refer to a call known by it, and the spare section processor then assumes responsibility for the message.

13. If processor 70 is completing a call setup or call takedown after the spare processor has begun operation, or if processor 70 similarly requires access to an IUBC or requires allocation or de-allocation of an IUB link time slot, it forwards an appropriate request to the spare processor since the latter processor has now taken over this aspect of control.

14. When processor 70 has been relieved of all call connections, i.e., it has taken down all call connections through its time slot interchanger block, the spare section processor will be carrying the full partition load. Processor 70 detects the all-clear state in its call record, takes down its communication channel connections to SERV processor 86, advises translation processor 87 of the changes, notifies the spare processor and disconnects its channel to the spare processor, and runs test and maintenance programs and requests manual repair.

Figure 7:
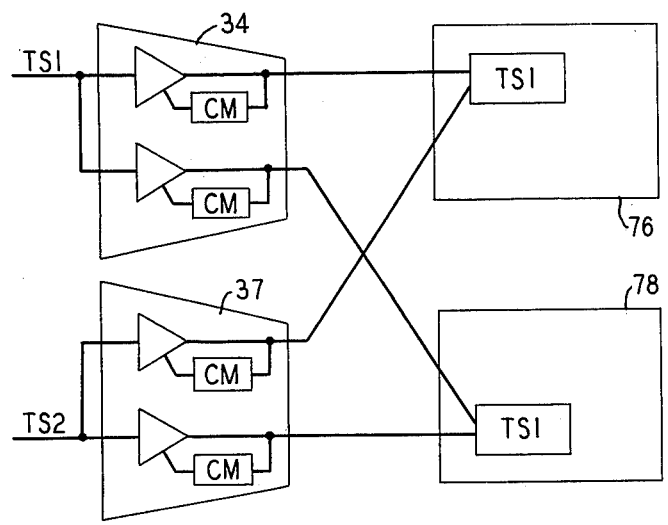
FIG. 7 is a simplified diagram illustrating an aspect of the reassignment of a network path from one partition to another.

The foregoing partition control section transfer operation may require an inordinate length of time if some calls controlled by the disabled control section last a relatively long time. (Most of the cutover typically occurs within a few minutes since the average call does not usually last longer than that.) Of course, the long calls could simply be dropped or switched over with a brief interruption. However, a procedure to be inserted after step No. 13 of the control section transfer procedure, and shown in the diagram of FIG. 7, permits uninterrupted service cutover as follows for each such long call:

13A. Assume that a time slot TS1 on one network port is connected through switch block 34, an interchanger in intermediate stage partition control section 76, and switch block 37 to a time slot TS2 on another network port. The spare section processor determines from its new link map information if there is a possible connection using the same time slots TS1 and TS2 through a time slot interchanger in intermediate stage spare control section 78.

13B. If not, abandon this uninterrupted cutover sequence and skip to step no. 13E. If there is a possible connection, the processor of spare section 78 sets the indicated time slot interchanger of that section to appropriate time slots for this path.

13C. The spare section processor then sets corresponding additional switch elements in blocks 34 and 37 so that there are in existence two equivalent paths for signals in time slots TS1 and TS2 at the indicated network ports.

13D. The spare section processor then so advises the processor 70 of partition control section 76 which in turn takes down its one of those two paths, thereby completing transfer of the call in progress without interruption.

13E. Spare section processor then loops back to step 13A if there are more long calls to be cut over.

It is possible that failures can occur in the low level SCAN, SERV, or translation processors. In the latter processor, a self-detected fault would initiate a switch to a running standby (not shown) on the same communications channels in the usual way for working-standby transfers. For handling externally detected failures, e.g., those detected by a partition processor communicating with the working translation processor, the partition processor simply actuates an alarm to initiate manual repairs and thereafter communicates with the standby translation unit at the corresponding stage 31 edge-side-port in the other one of the A and B networks.

If a fault occurs in a SCAN or a SERV processor that is self-detected, its interrupt routine sends to its partition processor a report of the fault. That processor interrogates translation processor 87 to locate a spare and connects a new communication channel to it as it would for a regular call connection setup procedure. A similar result is achieved if the fault is first detected at the partition processor by detecting a failure to respond or an unduly high error rate in messages.

It is apparent that since a unit of network port equipment, e.g., an LIU, and its scanner normally work under control of the same partition processor, at least the calling part of any call path is controlled by that processor. This approach to network operation tends to limit failures to a single partition.

It is possible to "grow" the described switching system over a considerable range of sizes in a relatively efficient manner, yet without requiring changes in existing interstage links, by merely adding links corresponding to the added equipment. For this growth plan, the system is begun with a small number of partition control sections (each fully equipped wtih TSIs), IUBs, SERV processors, SCAN processors, and the full complement of "additional stage" switch blocks; however, the latter blocks need be only partially equipped with muxdem switches.

In the initial system configuration, the items connected to the network-edge-side ports are divided as evenly as possible between the stage 31 switch blocks, and the switch blocks are equipped with enough muxdem switches to connect each switch block in an A or B network to each TSI in each partition of the same one of the A and B duplicate networks. During initial growth of the switching system, IUBs are added to handle the added growth in number of lines, with additions made evenly to the stage 31 blocks and SCAN and SERV processors are added as needed until the existing active partitions are full, in the sense of handling either the design maximum number of lines or the design maximum peak traffic. Then a cycle of further growth occurs as follows:

1. One partition control section, fully equipped with TSIs, is added.

2. Switches are added, if required, to each stage 31 switch block in order to connect all of the new partition TSIs to the existing switch blocks.

3. IUBs are added, one at a time, as the growth of LIUs requires, until one IUB has been added to each stage 31 switch block. Then a second IUB is similarly added to each switch block; and so on, until the new partition is fully loaded with IUBs, as previously described.

4. SCAN processors and SERV processors are added, as required by the new partition, to handle the new lines and extra traffic.

5. The translation processor 87 also has growable storage to handle additional translation table entries required by the added equipment. Initially, existing table entries are supplemented to show the increaased units of equipment and their characteristics. As subsequent growth phases are effected, timely additions are made to translation memory size.

6. New cycles of growth, i.e., the addition of new partitions, as described in steps 1-5, are carried out until the stage 31 switch blocks have been filled. For example, assume the maximum switch block size in stage 31 of 64 network-edge-side ports and 32 TSI-side ports; and further assume four TSI switches (each with eight input and eight output shift registers) in each partition control section of each of the A and B networks. Each partition can then handle about 15,000 lines and their corresponding traffic. This would allow seven active and one spare partition control sections at maximum size. Thus, the illustrative system can grow to about 105,000 LIUs before the stage 31 muxdem blocks become too large and the numbers of chips make wiring costs begin to offset economies of the partitioned network. At this point, any further growth requires rewiring of the network and possibly an additional network stage. That involves a more complex procedures, but it is one which is well known in the prior art.

One possible network design variation, which would permit construction of a somewhat larger network, is to abandon the requirement that each stage 31 switch block be connected to each TSI in each partition. Such an interstage linkage scheme could be designed according to the D. W. Hagelbarger U.S. Pat. No. 3,701,112 entitled "Balanced, Incomplete, Block Designs for Circuit Links Interconnecting Switching Network Stages."

Although the present invention has been described in connection with a particular application thereof, it is to be understood that additional applications, modifications, and embodiments which will be obvious to those skilled in the art are included within the spirit and scope of the invention.

What is claimed is:

1. In a switching network for selectively establishing interconnections between signal communication ports at the edge of the network, a plurality of stages in said network, one of said stages being divided into plural signal path switching blocks, a plurality of signal processors equal in number to the number of said blocks of said one stage, and means for coupling each of said processors to a different corresponding block of said one stage for controlling through said coupling means call path coupling both through that block and through a predetermined portion of each of the other stages of said network coupled between such block and an edge of said network.

2. The network in accordance with claim 1 in which said plurality of stages comprise said one stage being connected as an intermediate stage between at least two other ones of said stages in network call path interconnections between pairs of said ports, a multiblock, duplex, network-edge stage, and a multiblock, duplex, additional stage coupled between the edge stage and the intermediate stage, said additional stage including a plurality of blocks of switches, means for coupling at least one different switch of each of said additional stage blocks to each of said intermediate stage blocks, and means, in each additional stage block, for interconnecting said switches thereof on the network-edge-side of said additional stage so that any port on the latter side is accessible through one of said switches of such block from any coupling means port on the intermediate-stage side of such block.

3. The network in accordance with claim 2 in which there are provided means for coupling an input/output port of each of said processors to a network-edge-side port of one of said plurality of stages of said network, other than said intermediate stage, whereby switchable communication paths among said processors can be selectively established through said network.

4. The network in accordance with claim 2 in which each of said switches comprises means for multiplexing signals from plural input connections thereof at the network-edge-stage side of said switch onto an output connection on the intermediate-stage side of said switch in different time slots, means for demultiplexing signals from different time slots of an input on the intermediate-stage side of said switch to different outputs on the edge-stage side of said switch, and means for controlling connections of said multiplexing and demultiplexing means in different time slots, said controlling means comprising a control memory, means for writing into said control memory in response to signals addressed to the switch from a corresponding controlling processor on said input of said demultiplexing means, and means for reading out of said control memory either from sequential work locations thereof to control said multiplexing and demultiplexing means or from selectable word locations thereof to said output of said multiplexing means in response to interrogation from said controlling corresponding processor by way of said input to said demultiplexing means.

5. The network in accordance with claim 1 in which said network is a time division multiplex switching network with reconfigurable call path interconnections in plural time slots of recurring time frames, and said one stage is an intermediate stage and includes at least one time slot interchanging means in each of said intermediate stage blocks, means for coupling said interchanging means to be controlled from said processor which is coupled to such block, and means for coupling signals between the last mentioned processor and said plurality of stages through said interchanging means.

6. The network in accordance with claim 5 in which said time slot interchanging means comprises a control memory, and time slot exchange means, said exchange means including first and second random access buffer stores, means, including said control memory, for entering signals in successive locations in respective ones of said stores alternately in successive ones of said recurring time frames, and means, including said control memory, for withdrawing said signals from said stores alternately in successive ones of said recurring time frames and in a time slot exchanged sequence of said successive locations.

7. The network in accordance with claim 6 in which said signal entering means comprises plural means for supplying time division multiplex signals from another one of said plurality of stages, means in each of said supplying means for converting said time division multiplex signals from bit-series format to bit-parallel format, and means for storing said bit-parallel format signals of each time slot from said plural supplying means in successive time slot phase locations of a time slot block of locations of one of said stores;

said signal withdrawing means comprises means for reading signal information from randomly selectable time slot and phase locations of one of said stores in successive phases of successive time slots of each frame, plural means for converting signals from said reading means from bit-parallel to bit-series format, and means for coupling reading means output signals in different phases of each time slot to different ones of the last-mentioned converting means in recurring sequence, and said means for coupling signals between said last-mentioned processor and said plurality of stages through the interchanging means comprises means for coupling to the processor controlling said time slot interchanging means signals of a selectable phase of at least one predetermined time slot of each frame in said entering means, and means for coupling from the last-mentioned processor to said withdrawing means signals of a selectable phase of said predetermined time slot 38 in said withdrawing means.

8. The network in accordance with claim 1 in which each of said stages has a plurality of ports that are selectively interconnectible under control of said processors, each of said processors and its controlled block of said one stage is a network partition control section and at least one of said control sections is a spare control section, a second of said plurality of stages of said network has respective groups of port interconnections thereof controllable from different ones of said control section processors, each of said control section processors, other than any spare control section processor, has in its controlled predetermined network portion a predetermined group of the ports of said second stage, and
each control section processor includes means for transferring control of its predetermined group of ports, through said processor coupling means and said network, to a spare control section processor.

9. The network in accordance with claim 1 in which an additional stage of said plurality of network stages includes a plurality of stage blocks, each comprising
a plurality of switches,
means for coupling a different switch of such block to a port of each one of said blocks of said one stage, and
means in each of said switches, and controllable by said signal processor for the one stage block to which the switch is coupled, for coupling such one stage block through the switch to a selectable one of plural network-edge-side ports of said additional stage,
said plurality of stages further includes a network-edge stage having network-edge ports, and
means are provided in said network for coupling said network-edge ports through at least said network-edge stage to ports of said additional stage.

10. The network in accordance with claim 9 in which each of said processors controls exclusively call path coupling both through said one stage block to which it is coupled by said processor coupling means, and through said additional stage switches coupled to such block, and
each of said processors further controls call path coupling through a predetermined unique portion of said network extending to the edge of said network and accessible from each such controlled additional stage switch.

11. The network in accordance with claim 10 in which each of said processors includes
means for limiting said control of call path coupling by such processor to only a predetermined portion of said edge-stage ports to which said switches controlled by such processor having coupling access, for thereby defining said predetermined portion of said network.

12. The network in accordance with claim 11 in which
said network-edge stage ports are divided into plural groups of physically adjacent ports,
said network-edge stage coupling means includes means for coupling all ports of each said group of ports to a different block of said additional stage, and
said limiting means includes means for further limiting subgroups of each group of said ports to be controlled by different ones of said processors.

13. The network in accordance with claim 11 in which such processor is assigned to control a predetermined discrete portion of said edge-stage ports, and said limiting means includes
means, responsive to signals identifying any network edge-stage port, for determining the predetermined portion of said network to which such port is assigned for control, and
means, responsive to a determining means output indicating a predetermined portion not controlled by such processor, for sending a service request message to the processor for the last-mentioned predetermined portion.

14. The network in accordance with claim 9 in which there are provided
at least one means for scanning the electric signal state of multiple electric circuits, and
means for coupling said scanning means to a circuit port of one of said plurality of network stages for thereby coupling said scanning means, under control of one of said processors,
through said network to predetermined different ones of said edge-stage ports at different times for scanning electric signal states thereat, and
through said network to an input/output port of the one of said processors that controls said circuit port for reporting electric signal state changes at such predetermined edge-stage ports.

15. The network in accordance with claim 9 in which there is provided
at least one means for supplying switching network service circuit functions, and
means for coupling said service circuit function providing means to a port of one of said plurality of stages for coupling, under control, the corresponding one of said processors,
through said network to different edge-stage ports thereof at different times for sending to such port and receiving from such port predetermined service circuit function signals, and
through said network to an input/output port of said corresponding processor for sending reports of, and receiving commands for, selectable network service circuit functions.

16. The network in accordance with claim 9 in which there are provided
means, responsive to signals identifying a network-edge-stage port, for translating such signals to produce output signals identifying predetermined network facilities available to such port, and
means for coupling said translating means to a port of one of said stages for providing communication from such translating means, under control of at least one of said processors, through said network to selectable ones of such processors at different times for providing said translation facility function for such selectable processor.

17. In an edge-to-edge partitioned, multistage, switching network, a method for controlling interconnection path configuration through the network and comprising the steps of
applying signals to a switching block of an intermediate stage of said network for controlling call path configuration in said intermediate stage block,
applying signals through a preset path in said intermediate stage block for controlling call path configuration in additional stage switches directly linked to only said block, and
applying signals through said preset path and said directly linked switches for controlling call path configuration in only predetermined ones of switches of further stages of said network.

18. In a switching network for selectively establishing interconnections between signal communication ports at the edge of the network,
a plurality of controllable switching stages in said network, said stages being interconnected by plural link circuits, at least one of said stages being divided into plural signal path switching blocks,
a plurality of signal processors equal in number to the number of blocks of said one stage, means connected to each of said stages for controlling the establishment of said interconnections in such stage, the controlling means of each stage being divided into plural parts for controlling respective parts of such stage, each controlling means part of such stage being-in turn controlled by a different corresponding one of said processors, each block of said one stage being one of said parts of such one stage, means in said one stage for coupling the controlling means of each block of said one stage to be controlled directly from a different one of said processors, means for coupling each processor through its corresponding block for message communication by way of switchable connections in said network stages, and means in each other of said plurality of stages except said one stage for coupling each part of the controlling means thereof to an interstage link circuit to be controlled from its corresponding one of said processors by way of messages communicates on said link circuit.

19. The network in accordance with claim 18 in which said means for coupling said processors for message communication comprises means for coupling an input/output port of each processor to message input and output connections of its corresponding block of said one stage, and means for coupling an input/output port of each processor to message input and output connections of one of said other stages.

20. The network in accordance with claim 18 in which at least one of said other stages is divided into plural signal path switching sections, the part of each of said other stages controlled by each of said corresponding processors is subdivided into plural switches, and said plural switches controlled by such corresponding processor are located in different sections of such stage.

21. The network in accordance with claim 8 in which the spare control section processor comprises means, responsive to a transferor control section transferring means, for taking control of the predetermined group of ports in the transferor control section's predetermined network portion, and said control taking means includes means for establishing, for a portion of a network interconnection extending through the transferor control section block of the one stage, an electrically parallel interconnection portion through the one stage block of the spare control section before releasing the transferor section to take down the interconnection portion through the transferor control section block.

22. The network in accordance with claim 1 in which each of said processors is a stored program control processor programmed to perform for its block of said one stage, and for its predetermined portions of said other stages, the call processing functions including at least responding to a request at a first port of said network for service and as a result thereof establishing one of said interconnections through said stages to another of said network ports.

23. The network in accordance with claim 22 in which each of said processors comprises a low level processor coupled to one of said other stages for providing scanning functions for said ports of said network included in said predetermined portion of said other stages, a low level processor coupled to one of said other stages for providing call connection service functions for said ports of said network included in said predetermined portion of said other stages, and a higher level processor coupled to said block of said one stage for controlling the last-mentioned block, and said predetermined portion of said other stages in performing said call processing functions and coupled to said block through another of said stages for controlling said low level processors.

* * * * *